Sept. 18, 1962        R. W. ELLIOTT        3,054,265

SPEED CONTROL SYSTEM FOR GAS ENGINES

Filed Feb. 15, 1960        2 Sheets-Sheet 1

INVENTOR.
R.W. ELLIOTT

BY Hudson H. Young

ATTORNEYS

United States Patent Office 3,054,265
Patented Sept. 18, 1962

3,054,265
SPEED CONTROL SYSTEM FOR GAS ENGINES
Ralph W. Elliott, Bartlesville, Okla., assignor to Phillips
Petroleum Company, a corporation of Delaware
Filed Feb. 15, 1960, Ser. No. 8,588
12 Claims. (Cl. 60—97)

This invention relates to apparatus for regulation of the speed of an internal combustion engine. In one aspect it relates to regulation of speed of a plurality of internal combustion engines operating at the same speed. In another aspect it relates to regulation of the speed of a plurality of internal combustion engines from a remote location. This invention has utility in such an operation as one in which more than one engine powered pump are connected in series so that the full volume of liquid passes through each pump. Each pump increases incrementally the pressure of the liquid being pumped. With such a series arrangement all pumps should preferably operate at the same speed.

An object of this invention is to provide an apparatus for the regulation of the speed of a plurality of internal combustion engines operating at the same speed. Another object of this invention is to provide apparatus for the regulation, from a remote location, of the speed of a plurality of internal combustion engines, such as gas engines, operating at the same speed. Still other objects and advantages of this invetnion will be realized upon reading the following description which, taken with the attached drawing, forms a part of this specification.

Figure 1:
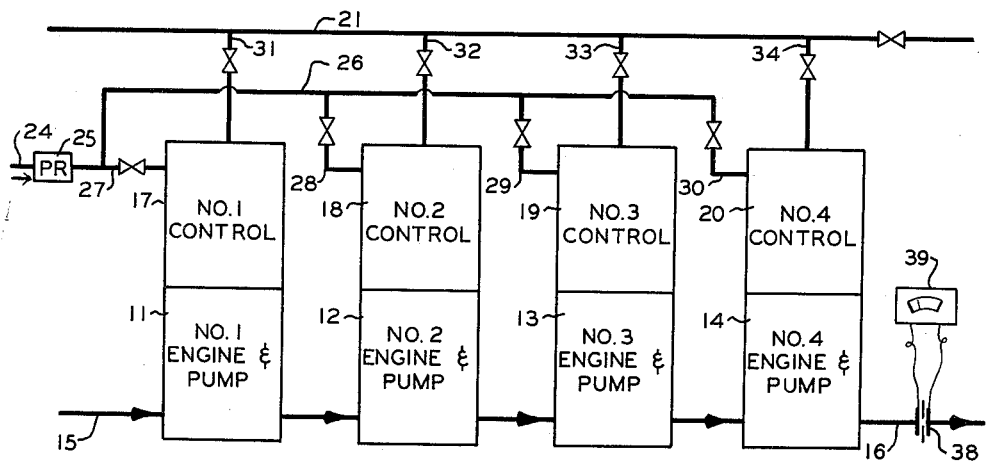
Figure 2:
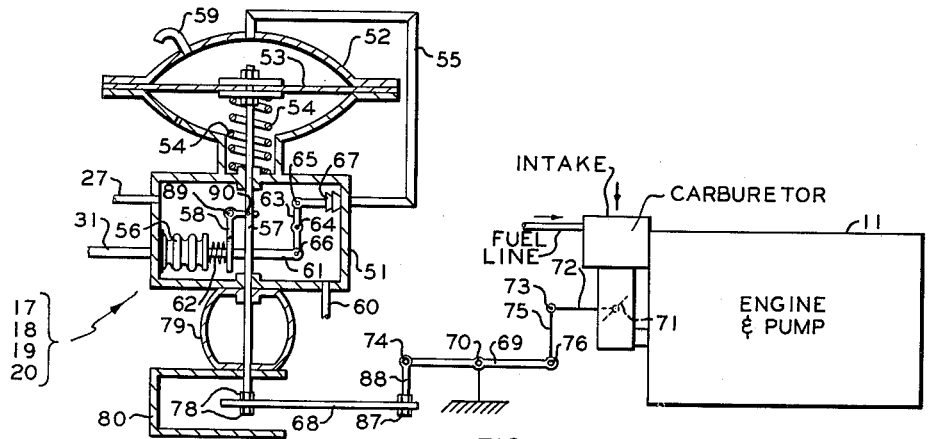
Figures 3, 4:
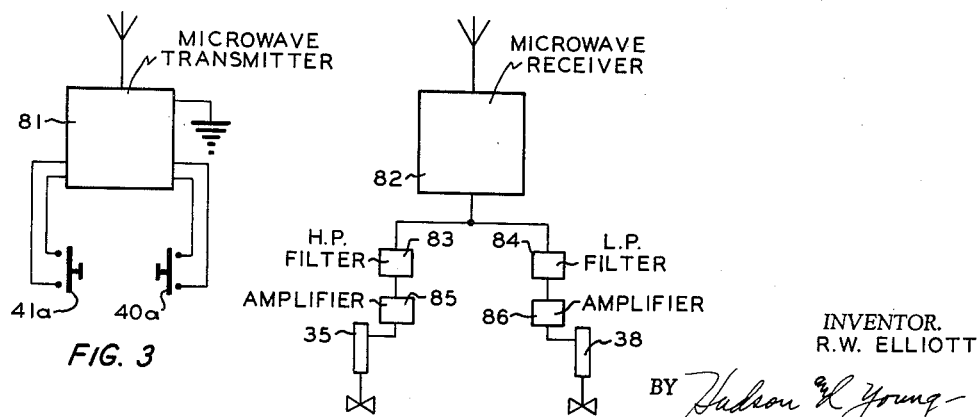
Figure 5:
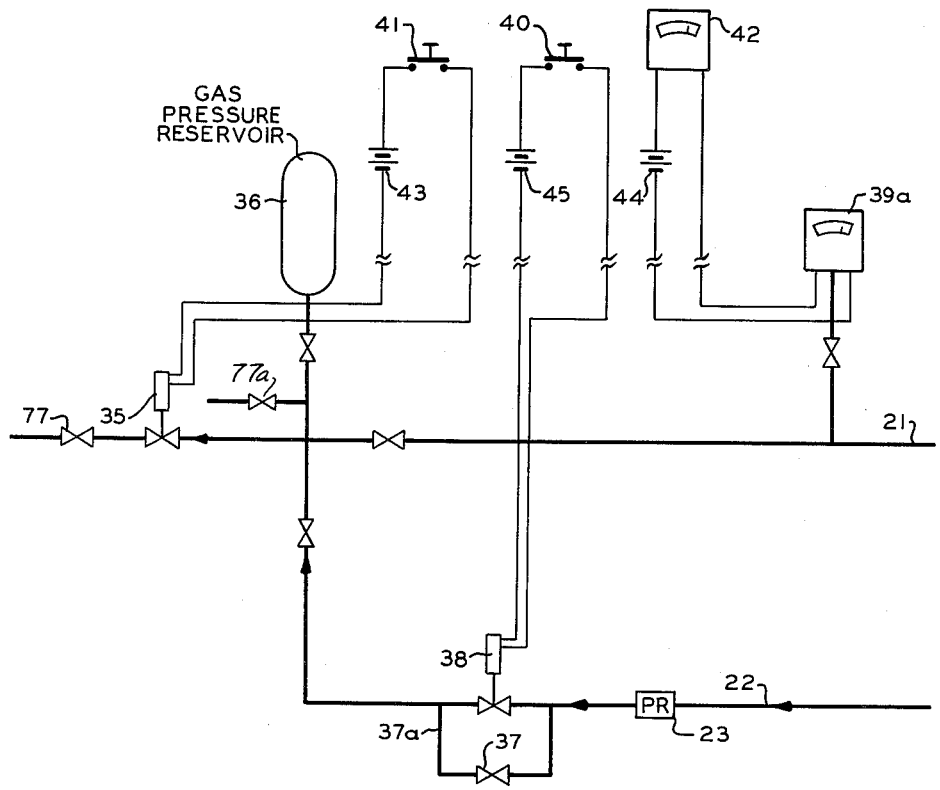

In the drawing, FIGURE 1 illustrates in diagrammatic form an assembly of apparatus for use in the practice of this invention. FIGURE 2 is an elevational view, partly in section, of a portion of the apparatus of FIGURE 1. FIGURES 3 and 4 are assemblies of apparatus parts for use with the apparatus of FIGURE 1. FIGURE 5 illustrates in diagrammatic form additional apparatus for use with the apparatus of FIGURE 1.

In FIGURE 1 of the drawing, reference numerals 11, 12, 13, and 14 illustrate diagrammatically an assembly of four internal combustion engine-pump units. In case the pump units are intended to pump, for example, water or oil for pipe line transmission, reference numeral 15 identifies the inlet pipe through which the liquid enters the first pump of the series. Reference numeral 16 identifies the final outlet pipe of the series of pumps. The rate of flow of the fluid in pipe 16 is measured by rate of flow recorder 39 connected across orifice 38a. Engine controls 17, 18, 19, and 20 are for the control, respectively, of the engines of units 11, 12, 13, and 14. Since these engines are internal combustion engines, controls 17, 18, 19, and 20 are operatively connected with butterfly valves of the respective carburetors. As illustrated in FIGURE 1, the several pump units of this invention are connected in series so that each pump can increase the pressure of the fluid being pumped by approximately a uniform amount; for example, if the pumps are pumping water and the pressure of the water in inlet pipe 15 is 15 p.s.i.g. (pounds per square inch gauge), each pump unit can, if desired, be operable to increase the pressure of the water 25 p.s.i.g. In this manner the pressure of the water in outlet pipe 16 will be approximately 115 p.s.i.g.

Apparatus for regulation of the speed of the several engines is as follows. A manifold tubing or pipe 21 is provided with side tubes 31, 32, 33, and 34, which are connected to controls 17, 18, 19, and 20, respectively. A tank 36, herein termed a gas pressure reservoir and illustrated in FIGURE 5, is connected operatively with tube 21. A source of supply gas, for example air, not shown, supplies air at, for example, 30 p.s.i.g. to tube 22. Air in pipe 22 is reduced in pressure by a pressure regulator 23 after which the air passes on to the manifold tube 21. Tube 22 also contains a solenoid valve 38 around which a by-pass tube 37a is provided, as illustrated. By-pass tube 37a contains a valve 37. Manifold tube 21 is provided with a solenoid valve 35 as illustrated and with a needle valve 77.

Solenoid valve 35 is actuated electrically by a push button 41 located at some desired remote point. Reference numeral 43 identifies a source of electromotive force in the circuit of the solenoid valve 35. Similarly, solenoid valve 38 is actuated by a push button 40 located at some desired remote point. This circuit is energized by a source of electromotive force 45. A pressure telemeter transmitter 39a, calibrated in r.p.m. (revolutions per minute), indicates the speed of the several engines relative to air pressure in tube 21. Transmitter 39a is preferably located at a convenient point in the immediate vicinity of the engines being controlled for observation of the operation of the engines whenever an operator inspects the equipment. Connected with the telemeter transmitter 39a is an engine speed indicator 42 which is located in the immediate vicinity of the push buttons 40 and 41 at their remote locations. A source of electromotive force 44 provides energy for operation of the transmitter 39a and indicator 42.

The controls 17, 18, 19, and 20 are similar to each other and are illustrated in FIGURE 2. In this figure a case 51 is provided with an air bleed nozzle 60 and several inlet and/or outlet openings. The apparatus is a pneumatically-operated diaphragm motor which operates a butterfly valve 71 of the carburetor of each engine. A diaphragm 53 is encased within housing 52, the latter being provided with a bleed tube 59. The diaphragm motor is spring-loaded with a compression spring 54 to maintain the diaphragm in a normally elevated position. A rod 57 is attached to the diaphragm 53 as illustrated and this rod extends downward through housing 51 and to an apparatus therebelow. This apparatus comprises a support frame 79 attached to the underside of which is attached a U-shaped member 80. As illustrated in this figure, this U-shaped member provides stops to regulate the extent of the upward and downward movements of rod 57.

Within case 51 is provided a pneumatically operable bellows 56. One end of this bellows is attached rigidly to case 51 while the other end is the movable end. To this movable end is attached a rod 61 pivoted at 66 to an arm 63 which, in turn, is pivoted to rotate around a pivot 64. The other end of arm 63 is pivoted at pivot 65 to a valve head member 67. This valve head member is intended to regulate flow of air from within case 51 to a tube 55. This tube conducts air to the space above diaphragm 53 in the motor. Tube 24 is provided with a pressure regulator 25 for regulating air pressure from a source, not shown.

In FIGURE 1, to tube 24 is connected a manifold tube 26 which passes control air from regulator 25 to the respective controls 18, 19, and 20 through tubes 28, 29, and 30, respectively. Tube 27 passes air from tube 24 directly to control 17.

At the lower end of rod 57 of FIGURE 2 a plate 68 is attached between a pair of nuts 78. These nuts 78 are actually adjusting nuts and by proper adjustment thereof the position of plate 68 with respect to the adjacent arms of the U-shaped member 80 can be adjusted to regulate the speed of the engine with respect to the position of diaphragm 53. To the end of arm 68 opposite nuts 78 is another pair of adjusting nuts 87 which maintain a rod 88 in its proper position. To the upper end of rod 88 is pivoted at pivot 74 an arm 69. This arm 69 rotates around a pivot or fulcrum 70. The other end of arm 69 is pivoted at 76 to an arm 75 which, in turn, is pivoted at 73 to a lever arm 72. This lever arm 72 is connected directly to the shaft of the butterfly valve 71 in the carburetor.

Tube 31 leads or conducts air from manifold tube 21 of FIGURE 1 to operate the apparatus of FIGURE 2. Thus, air from tube 31 passes into bellows 56 with the result that the bellows expands and rod 61 moves from left to right. This movement moves valve 67 to the left, thereby allowing air from within case 51 to flow through tube 55 into the space of the motor above diaphragm 53. The air for passage through tube 55 enters case 51 from tube 27. Upon increase of air pressure above diaphragm 53, the diaphragm and the attached rod 57 move downward with the result that lever arm 72 rises to throttle the butterfly valve 71 and thus reduces the speed of the engine.

In order to make the operation of this pneumatic motor more sensitive, a lever 58 is pivoted at 89. Lever 58 has, in general, the shape illustrated and one end is pivoted at 90 to rod 57. The opposite end of lever 58 extends around rod 61 and presses against a spring 62 which, in turn, bears against the closed end of bellows 56. Thus, upon downward movement of rod 57, spring 62 is compressed, tending to offset the expansion of bellows 56 as it expands from increased air pressure from tube 31. In this manner the operation of this motor is easily controlled by slight changes of air pressure from tube 31.

Air is maintained in the gas pressure reservoir 36 at a pressure between about 3 and 15 p.s.i.g. With the air in reservoir 36 at a pressure of about 9 p.s.i.g. (halfway between 3 and 15 p.s.i.g.), the engines are intended to run at their normal full-load operating speed.

When it is desired to increase the speed of the engines, the electrical circuit, including push button switch 41, is closed, thereby opening solenoid valve 35. Air from reservoir 36 escapes through solenoid valve 35 and needle valve 77 to the atmosphere. Needle valve 77 may be regulated to bleed off the pressure rapidly or slowly as desired. When the pressure in reservoir 36 is reduced to some desired pressure, for example 7 p.s.i.g., push button 41 is released and solenoid valve 35 closes. Air pressure in reservoir 36, tube 21, and in the connecting side tubes 31, 32, 33, and 34 is equalized to the new reduced pressure. With the reduction of pressure in tube 31, bellows 56 contracts and moves pivot 66 from right to left and pivot 65 from left to right, thereby at least partially closing valve 67 which, in turn, reduces air pressure in tube 55 to the diaphragm 53. A reduction of air pressure above diaphragm 53 allows compression spring 54 to raise the diaphragm 53 and rod 57 along with plate 68. The elevation of plate 68 raises pivot 74, lowers pivot 76, thereby opening somewhat butterfly valve 71 and increasing the engine speed.

When it is desired to reduce the engine speed, it is merely necessary to open solenoid valve 38 by pushing the button of push button switch 40, which operation allows air from pipe 22 and regulator 23 to enter reservoir 36, thereby increasing the pressure therein. This increase of pressure is equalized in tube 21 and in the respective side outlets 31, 32, 33, and 34. Thus, upon increase of air pressure in tube 31, bellows 56 expands and the operation of the several parts of control 17 works just the opposite from the operation explained above with the final result that butterfly valve 71 is partially closed, thereby reducing the speed of the engine.

The valve 37 in by-pass tube 37a and the valve 77a are provided in case it is ever desired to regulate the speed of the engines without use of the remote controls, as for example, at times when an operator is at the location of the engine plant.

As mentioned above, each of the engines is provided with the control apparatus illustrated in FIGURE 2 and, with a given air pressure in manifold tube 21, adjusting nuts 78 and/or 87 are adjusted on the several controls so that all of the engines operate at the same or substantially at the same number of revolutions per minute.

When these adjustments are made, then it is obvious that the increase or the decrease of air pressure in reservoir 36 causes the same change in speed of the several engines.

While in FIGURE 5 the change of air pressure in reservoir 36 was brought about by push button operation of the solenoid valves 35 and 38, other means for actuating the solenoid valves can be employed, such as by a microwave transmitter-receiver system. Such a system is particularly advantageous in case it is desired to operate such an engine system from a point extremely remote from the system. For example, if an operator at one location desires to control an engine system a number of miles removed, or if it is desired to control more than one engine system at such remote points from the operator, a microwave system is advantageous.

A microwave system suitable for use is herein illustrated in FIGURES 3 and 4. Reference numeral 81 identifies a microwave transmitter. Reference numeral 82 identifies a microwave receiver. This receiver is in electrical communication with a high-pass filter 83, and a low-pass filter 84, as illustrated. Amplifiers 85 and 86 are connected as illustrated to the respective filters and to the solenoid valves 35 and 38, respectively.

In operation, for example, a push button switch 40a is operated to energize the microwave transmitter to emit microwaves modulated at, for example, 400 cycles per second. This radiation is received by receiver 82 and the modulation signal is transmitted to filters 83 and 84. Only the low-pass filter 84 passes this low frequency energy to amplifier 86. This electrical energy is amplified in amplifier 86 to energize the solenoid of the solenoid valve 38, thereby opening the valve. In this manner air pressure is admitted to the reservoir 36. An increase of air pressure in reservoir 36 throttles the butterfly valve 71 to reduce or throttle the speeds of the several engines. In case it is desired to increase the speed of the engines, push button switch 41a is actuated, thereby causing transmitter 81 to radiate waves modulated at, for example, 800 cycles per second. Receiver 82 receives this radiation and transmits the modulation signal to the filters 83 and 84. Only the high-pass filter 83 passes this higher frequency signal. The low-pass filter 84 will not pass the 800 cycles per second energy. The 800 cycle energy passes on through filter 83 and is amplified in amplifier 85 which, in turn, provides sufficient energy for actuating the solenoid of valve 35, thereby actuating this valve to bleed off air pressure from reservoir 36. A reduction of pressure in reservoir 36 is utilized in manifold tube 31 and in the several side tubes 31, 32, 33, and 34, and accordingly the respective engines and their butterfly valves are opened thereby increasing the engine speed.

While I have explained the operation of the apparatus of this invention as applied to a four-engine system, it is obvious that any number of engines more than four or less than four can be operated in this manner.

While certain embodiments of the invention have been described for illustrative purposes, the invention obviously is not limited thereto.

While the invention has been described relative to gas engine operation, it is realized that the throttle valves on gasoline fueled and on diesel fueled engines can be regulated in the same manner as the regulation of the throttle valves on the gas fueled engines. These engines have throttle valve controls regardless of the type of fuel on which the engine operates.

I claim:
1. A method for regulating the speed of an internal combustion engine having a carburetor in operative communication therewith, said carburetor having a throttle valve for regulation of intake air flow therethrough, a pneumatically operable diaphragm motor with linkage means operatively connecting said diaphragm motor with said throttle valve, comprising passing air under pressure to one side of said diaphragm motor for operating said diaphragm motor, controlling the rate of said passing responsive to the pressure in a reservoir zone, increasing the pressure in said reservoir zone to change said speed in a first direction, and decreasing the pressure in said reservoir zone to change said speed in the opposite direction.

2. The method of claim 1 further comprising controlling the increasing and decreasing of the pressure in said reservoir zone responsive to a microwave radio signal generated at a point distant from said engine.

3. Apparatus for regulating a valve comprising, in combination, a first source of fluid under pressure, a reservoir for storage of fluid under pressure, a first conduit communicating said reservoir with said first source, a first valve which is to be controlled, a pneumatically operable diaphragm motor, linkage means operatively connecting said diaphragm motor with said first valve, a second source of fluid under pressure for operating said diaphragm motor, a pneumatic controller operatively communicating said second source with said diaphragm motor, a second conduit operatively communicating said reservoir with said controller, means in communication with said reservoir for exhausting fluid therefrom thereby reducing pressure of fluid therein, and a second valve operatively disposed in said first conduit for regulation of the flow of fluid into said reservoir from said first source, whereby said diaphragm motor regulates said first valve by actuating said first valve in response to pressure of fluid in said reservoir.

4. Apparatus according to claim 3 wherein said means in communication and said second valve are first and second solenoid valves, respectively, and further comprising separate means extending from a point remote from the solenoid valves for energizing same to open said second solenoid valve for increasing fluid pressure in said reservoir and for opening said first solenoid valve for reducing fluid pressure in said reservoir.

5. Apparatus according to claim 4 wherein said separate means includes a first electrical push button apparatus for closing an electrical circuit for energizing said first solenoid valve to open same and a second electrical push button apparatus for closing an electrical circuit for energizing said second solenoid valve to open same.

6. Apparatus according to claim 4 wherein said separate means includes a microwave radio system adapted to radiate and to receive microwaves of at least two frequencies, said first solenoid valve being adapted to open as its solenoid is energized by microwaves of one of said frequencies and said second solenoid valve being adapted to open as its solenoid is energized by microwaves of the other of said frequencies.

7. Apparatus for regulating the speed of an internal combustion engine comprising, in combination, a first source of air under pressure, a reservoir for storage of air under pressure, a first conduit communicating said reservoir with said first source, an internal combustion engine having a carburetor in operative communication therewith, said carburetor having a throttle valve for regulation of intake air flow therethrough, a pneumatically operable diaphragm motor, linkage means operatively connecting said diaphragm motor with said throttle valve, a second source of air under pressure for operating said diaphragm motor, a pneumatic controller operatively communicating said second source with said diaphragm motor, a second conduit operatively communicating said reservoir with said controller, means in communication with said reservoir for exhausting air therefrom thereby reducing pressure of air therein, and a control valve operatively disposed in said first conduit for regulation of the flow of air into said reservoir from said first source, whereby said diaphragm motor regulates the speed of said engine by actuating said throttle valve in response to pressure of air in said reservoir.

8. Apparatus according to claim 7 wherein said means in communication and said control valve are first and second solenoid valves, respectively, and further comprising separate means extending from a point remote from the solenoid valves for energizing same to open said second solenoid valve for increasing air pressure in said reservoir and for opening said first solenoid valve for reducing air pressure in said reservoir.

9. Apparatus according to claim 8 wherein said separate means includes a microwave radio system adapted to radiate and to receive microwaves of at least two frequencies, said first solenoid valve being adapted to open as its solenoid is energized by microwaves of one of said frequencies and said second solenoid valve being adapted to open as its solenoid is energized by microwaves of the other of said frequencies.

10. Apparatus for operating a plurality of internal combustion engines comprising, in combination, a first source of air under pressure, a reservoir for storage of air under pressure, a first conduit communicating said reservoir with said first source of air, a plurality of internal combustion engines, each engine being provided with a carburetor in operative communication therewith, each carburetor having a separate butterfly valve for regulation of intake air flow therethrough, a separate pneumatically operable diaphragm motor for each engine, separate linkage means operatively connecting each diaphragm motor with its respective butterfly valve, a second source of air under pressure for operating the diaphragm motors, a separate pneumatic controller operatively communicating said second source with each respective diaphragm motor, a plurality of second conduits operatively communicating said reservoir with each respective controller, means in communication with said reservoir for exhausting air therefrom thereby reducing pressure of air therein, and a control valve operatively disposed in said first conduit for regulating the flow of air into said reservoir from said first source, whereby each of the diaphragm motors regulates the speed of its respective engine by actuating its respective butterfly valve in response to pressure of air in said reservoir.

11. Apparatus according to claim 10 wherein said means in communication and said control valve are first and second solenoid valves, respectively, and further comprising separate means extending from a point remote from the solenoid valves for energizing same to open said second solenoid valve for increasing air pressure in said reservoir and for opening said first solenoid valve for reducing air pressure in said reservoir.

12. Apparatus according to claim 11 wherein said separate means includes a microwave radio system adapted to radiate and to receive microwaves of at least two frequencies, said first solenoid valve being adapted to open as its solenoid is energized by microwaves of one of said frequencies and said second solenoid valve being adapted to open as its solenoid is energized by microwaves of the other of said frequencies.

References Cited in the file of this patent

UNITED STATES PATENTS

| | | |
|---|---|---|
| 1,653,172 | Hammond | Dec. 20, 1927 |
| 2,223,692 | Marec | Dec. 3, 1940 |
| 2,666,295 | Stevens | Jan. 19, 1954 |
| 2,680,818 | Ringwald | June 8, 1954 |
| 2,714,290 | Rachuig | Aug. 2, 1955 |
| 2,780,210 | Renken | Feb. 5, 1957 |
| 2,796,055 | Cornelius | June 18, 1957 |
| 2,817,211 | Reiners | Dec. 24, 1957 |
| 2,916,885 | Smith | Dec. 15, 1959 |